(12) United States Patent
Randall

(10) Patent No.: US 9,221,379 B2
(45) Date of Patent: Dec. 29, 2015

(54) METHOD FOR TRANSPORTING A CURVED WIND TURBINE BLADE AND ASSOCIATED TRANSPORTATION DEVICE

(71) Applicant: VESTAS WIND SYSTEMS A/S, Aarhus N (DK)

(72) Inventor: Stephen Randall, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/802,396

(22) Filed: Jul. 17, 2015

(65) Prior Publication Data
US 2015/0321596 A1    Nov. 12, 2015

Related U.S. Application Data

(62) Division of application No. 14/369,933, filed as application No. PCT/DK2012/050485 on Dec. 20, 2012, now Pat. No. 9,120,417.

(60) Provisional application No. 61/581,342, filed on Dec. 29, 2011.

(30) Foreign Application Priority Data

Dec. 30, 2011   (DK) .................................. 2011 70770

(51) Int. Cl.
*B60P 7/08*    (2006.01)
*B60P 3/40*    (2006.01)
*B60P 7/12*    (2006.01)
*F03D 1/00*    (2006.01)

(52) U.S. Cl.
CPC ... *B60P 3/40* (2013.01); *B60P 7/12* (2013.01); *F03D 1/005* (2013.01)

(58) Field of Classification Search
CPC ............... B60P 7/12; B60P 3/40; F03D 1/005
USPC ........................................ 410/34, 44, 45, 120
See application file for complete search history.

(56) References Cited

U.S. PATENT DOCUMENTS 7,303,365 B2 *  12/2007  Wobben .................... B60P 3/40
                                                                        410/45

* cited by examiner

*Primary Examiner* — Stephen Gordon
(74) *Attorney, Agent, or Firm* — Wood, Herron & Evans, LLP

(57) ABSTRACT

A method of transporting a wind turbine blade with a curved central longitudinal axis includes loading the wind turbine blade onto a transportation device including first and second support bearings. The wind turbine blade is loaded in a first orientation in which the curved central longitudinal axis is located in a generally vertical plane. When the transportation device is preparing to turn, the wind turbine blade is rotated to a second orientation before or during turning such that the curved central longitudinal axis is located in a generally horizontal plane and bends around the turn. As a result, the curved wind turbine blade and transportation device can traverse tighter curves and turns during travel to an assembly site or quayside.

16 Claims, 13 Drawing Sheets

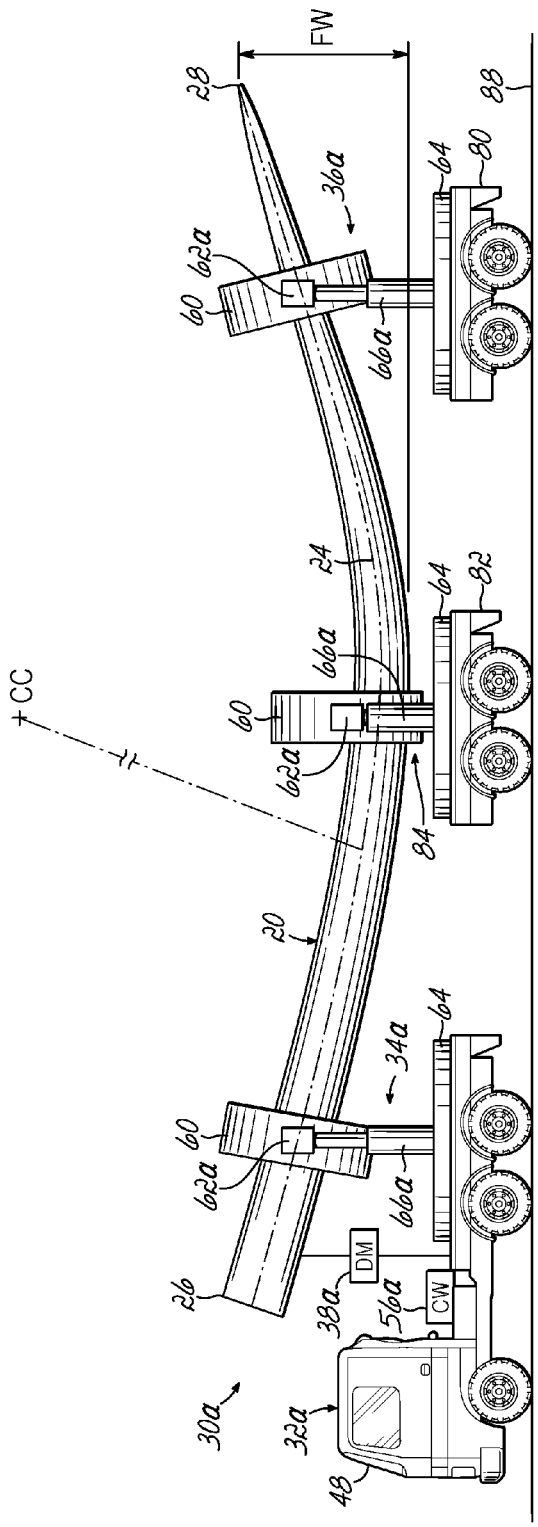
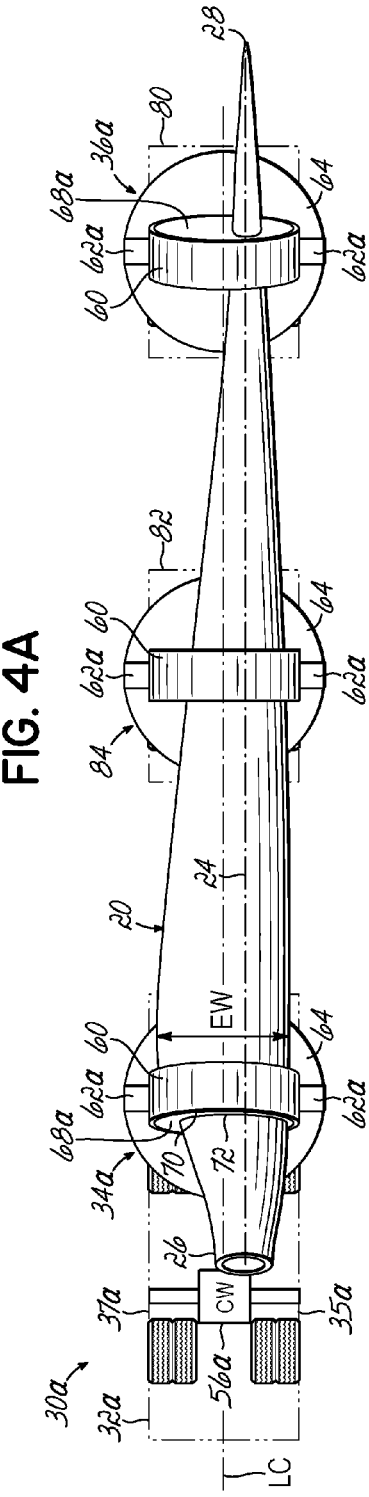
FIG. 4A
FIG. 4B

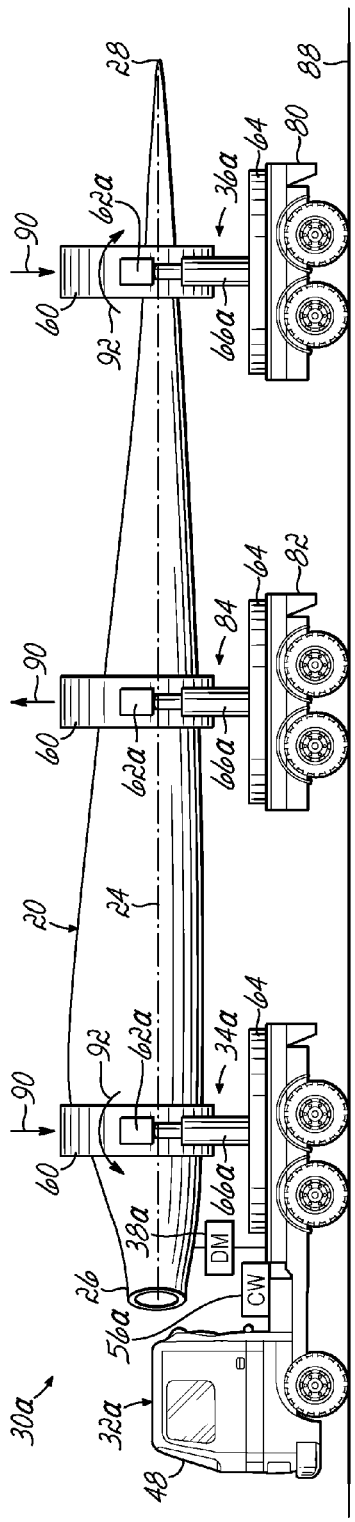
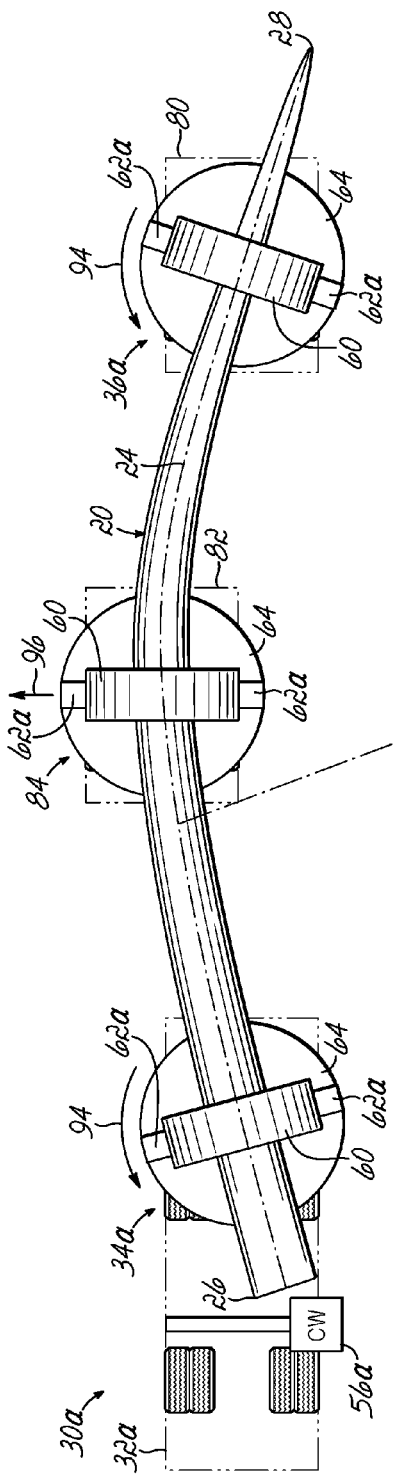
FIG. 5A
FIG. 5B

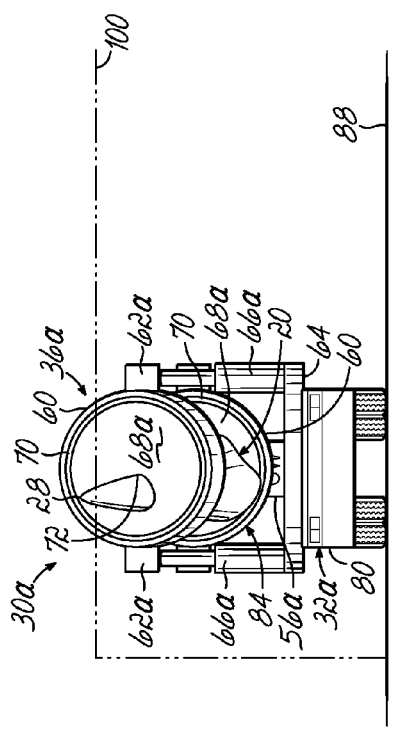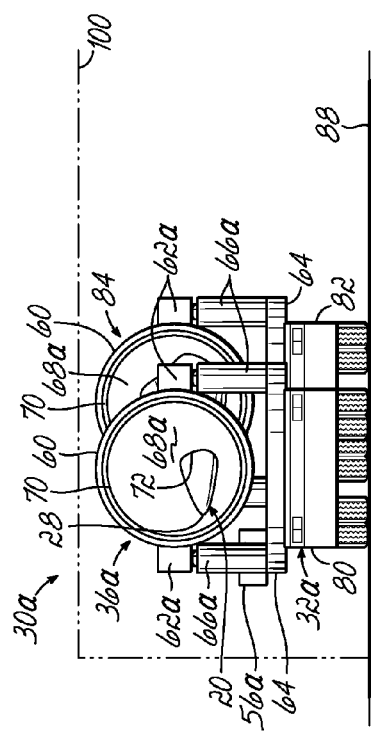

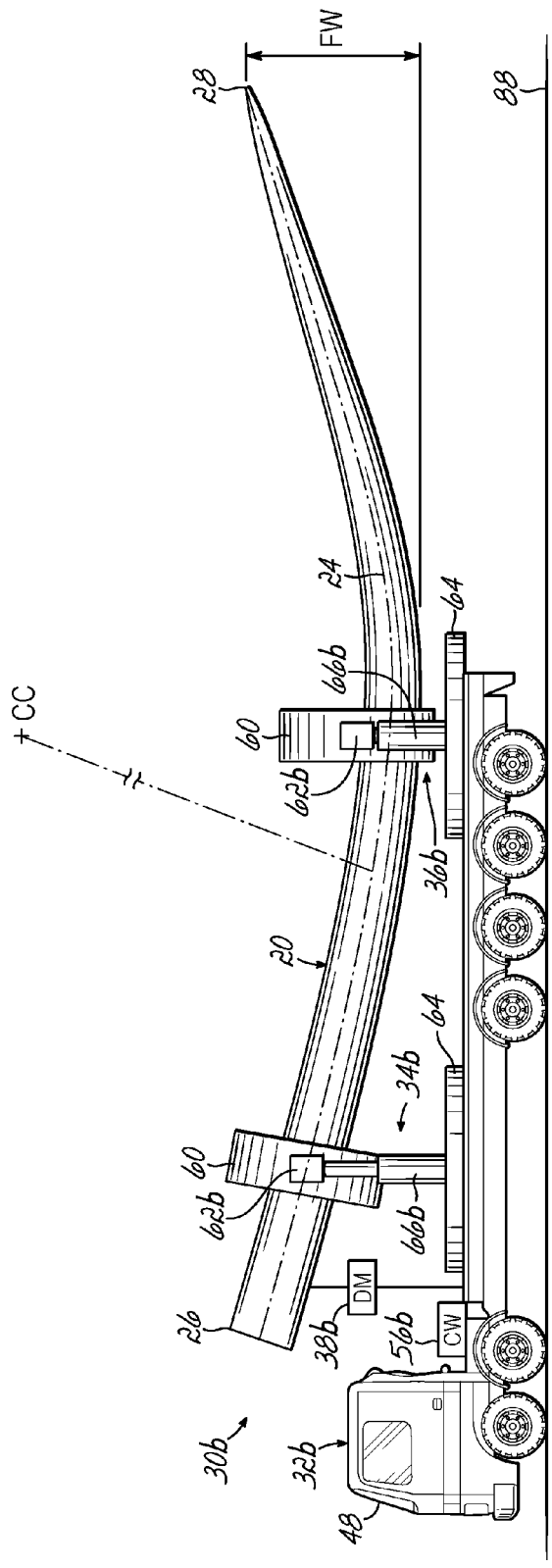
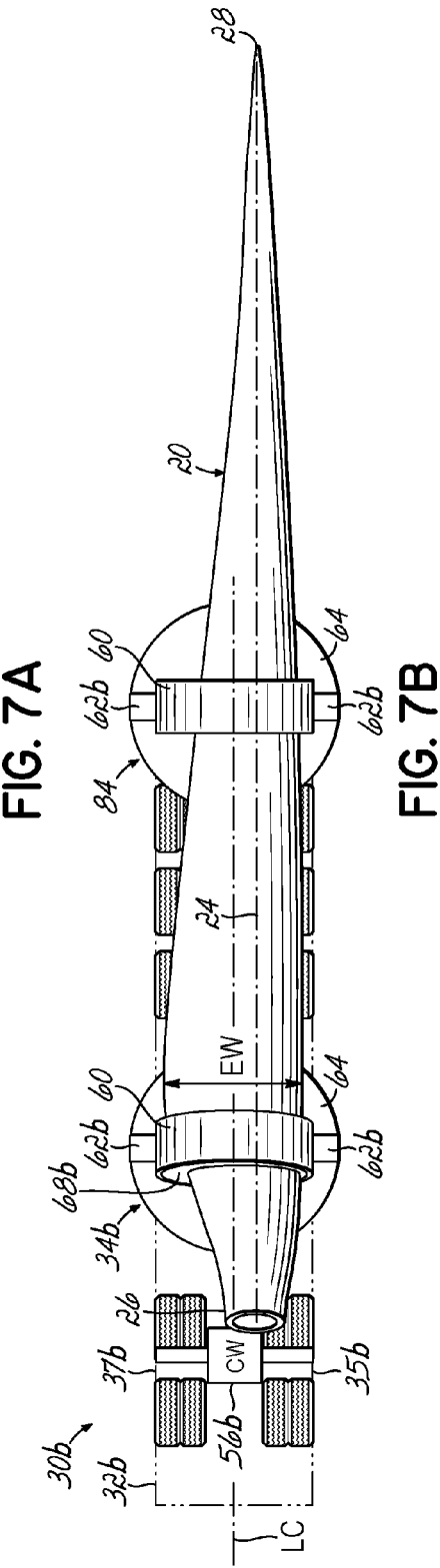
FIG. 7A
FIG. 7B

METHOD FOR TRANSPORTING A CURVED WIND TURBINE BLADE AND ASSOCIATED TRANSPORTATION DEVICE

CROSS-REFERENCE TO RELATED APPLICATIONS

The present application is a divisional of pending U.S. patent application Ser. No. 14/369,933 filed Jun. 30, 2014, now issued as U.S. Pat. No. 9,120,417, which is a U.S. National Phase Application of PCT/DK2012/050485 filed Dec. 20, 2012, which claims the benefit of U.S. Provisional Application Ser. No. 61/581,342 filed Dec. 29, 2011. International application PCT/DK2012/050485 designates the United States and claims priority to Danish Patent Application No. PA 2011 70770 filed Dec. 30, 2011. Each of these applications is incorporated by reference herein in its entirety.

TECHNICAL FIELD

This application relates generally to wind turbines, and more particularly to a transportation device and method for transporting a wind turbine blade in which the wind turbine blade may be rotated when mounted on the transportation device.

BACKGROUND

In a typical on-shore wind turbine installation, various components of the wind turbine, such as, for example, the nacelle, tower or tower sections, rotor hub, rotor blades, etc., may be transported to the installation site separately and then assembled together on site so as to result in an operational wind turbine. In this regard, due to the relatively large size of some of these components, the transportation thereof is typically carried out using one or more tractor trailers, which travel along the existing network of roads, highways, expressways, etc. (collectively referred to herein as roads) to the installation site. Additionally, in off-shore wind turbine installations, which can be significantly larger than on-shore installations, wind turbine components are typically transported using tractor trailers on the existing network of roads from a factory, for example, to quayside where the components may be loaded onto boats for transport to the off-shore installation site.

Many of the existing roads used in the transportation of wind turbine components are divided into lanes so as to accommodate other vehicles moving in, for example, the same direction or an opposing direction, and may further have a shoulder on the sides of the outer most lanes. These lanes have a certain width that, in the normal course, accommodates most of the traffic on the road. Moreover, in many countries, regions, etc., various road signage is located just off the shoulders for aiding, informing, guiding, etc. those traveling on the road. In many instances, the distance between the inner boundary of the outer lane and the road signage may be between 5 to 6 meters. This distance then represents the maximum width of a vehicle (or a load carried by the vehicle) that may travel on the road without obstructing vehicles traveling in an adjacent lane and without damaging or otherwise destroying the road signage adjacent the road.

Additionally, many existing roads pass under bridges at highway intersections and similar junctions. In some circumstances, these bridges only provide a height clearance of 4 to 5 meters from the surface of the road. This height clearance represents the maximum height of a vehicle and its associated load that may travel on the road without impacting the bridge. Most existing roads do not extend in a completely straight path, and the transport path from the factory to the installation site or quayside may include a number of curves and turns at road intersections. Therefore, a vehicle transporting a wind turbine component must also traverse curved paths in the road as well as relatively sharp corners at road intersections, in addition to staying within the maximum width during normal operation and staying within the maximum height when going under a bridge.

Wind turbine blades are typically transported to an installation site or quayside on a tractor trailer. Conventionally, the blade was typically loaded on a tractor trailer and secured thereto in a fixed position so that the blade did not essentially move during transit. However, the trend in wind turbine construction has been for the power output and physical size of the wind turbine to scale upward. As a result, more recent wind turbine blades have included larger lengths and widths that increase the difficulties of transporting the blades on existing roads. Transportation devices have been developed for transporting these larger wind turbine blades.

For example, the transportation device described in U.S. Pat. No. 7,303,365 to Wobben operates to rotate the wind turbine blade along its straight longitudinal axis during transport so that a maximum width of the blade is oriented generally horizontal to fit under bridges and oriented generally vertical to limit the total width of the vehicle and load during normal operation. However, this transportation device continues to struggle with managing the length of the blade during sharp turning or cornering operations.

Also US 2011/0142589 discloses a way of dealing with passing low passages, however in relation to transporting curved blades. A curved blade is held in a pivotable and slidable cradle (FIG. 2, reference 140). While passing low passages the curved blade is tilted to pass a first section of the passage by keeping a root end (56) of the blade low, while the tip end (54) is high, and passing the remaining part of the passage by elevating the root end (56) of the blade, which lowers the tip end (54) of the blade (FIG. 3). Again, this document only relate to passing low passages and not turning in any way.

DEFINITIONS

Normally in the past wind turbines blades were generally straight, whereby is has become normal terminology to use the term "a longitudinal axis" of a blade. In order not to confuse the skilled reader, it has been chosen in this present document to stick with the term "longitudinal axis", although the blades in the present context, see below, are curved i.e. e.g. being prebent in a way, such that when the blades are mounted on a wind turbine facing the wind, the curvature gradually form the blade to lean into the wind, i.e. being prebent in an upwind direction. This in the following described as the blades have a "curved longitudinal axis" or "central curved longitudinal axis". Also with respect to normal terminology, when looking at a normal blade, i.e. in a non-prebent blade a "flapwise plane" would exist. This term is again chosen to stick with, in order not to confuse a skilled reader. So when the terms "flapwise plane", "horizontal plane" or "vertical plane" are used in the present context, this is to be read and understood as a "flapwise direction", "horizontal direction" or "vertical direction"; or understood as a "a number of flapwise directions", "a number of horizontal directions" or "a number of vertical directions". Moreover, the formulation that "the curved longitudinal axis is located in a generally vertical plane" is to be understood as a curved blade having its curvature of the longitudinal axis, e.g. when seen as a drawn line, this curved axis is actually and substantially lying within a vertical plane. Similarly, the formulation that "the curved longitudinal axis is located in a generally horizontal plane" is to be understood as a curved blade having its curvature of the longitudinal axis, e.g. when seen as a drawn line, this curved axis is actually and substantially lying within a horizontal plane. These definitions follow clearly and unambiguously from the appended Figs and description of the figures as well as the document as a whole.

A new trend in wind turbine construction is forming curved wind turbine blades, as addressed above, having a substantially curved longitudinal axis in at least one plane (for example, in the flapwise plane). These curved wind turbine blades, or prebent blades are believed to produce enhanced efficiency of power generation with lower bending and torsional stresses on the blade. But curving the wind turbine blade may increase a maximum effective blade width in the plane of curvature, which would be measured in the example above (flapwise plane) between a leeward side at the center of the blade and a windward side at the tip or root of the blade. With the ever-expanding physical size of wind turbine blades, it is expected that these maximum effective blade widths in the plane of curvature will continue to increase, which will make the transportation thereof to the installation site or quayside on existing roads more problematic. For example, the dimensions may make it such that the wind turbine blade may not be transported on a tractor trailer using existing roads without a significant risk of interfering with adjacent traffic, damaging road signage, or cutting corners at an intersection. In this regard, the conventional transportation devices described above are ineffective at handling curved wind turbine blades in these varying road conditions.

Thus, there is a need for a transportation method and associated device that allows large-scale curved wind turbine blades to be transported to wind turbine installation sites or quayside via the existing network of roads.

SUMMARY

To address these and other shortcomings, a method of transporting a curved wind turbine blade includes loading the wind turbine blade onto a transportation device including first and second support bearings configured to receive the wind turbine blade. The wind turbine blade is loaded in a first orientation such that a curved central longitudinal axis of the blade is located in a generally vertical plane. When the transportation device is preparing to turn in a turning direction, the method also includes rotating the wind turbine blade to a second orientation before or during turning. In the second orientation, the curved central longitudinal axis of the blade is located in a generally horizontal plane and bends in the turning direction. As a result, the curved wind turbine blade and transportation device can traverse tighter curves and turns during travel to an assembly site or quayside.

In one aspect, rotating the wind turbine blade to the second orientation includes rotating the wind turbine blade along the central longitudinal axis and translating at least one of the first and second support bearings in a direction transverse to the central longitudinal axis. One of the first and second support bearings may also rotate about an axis perpendicular to the central longitudinal axis during rotation of the wind turbine blade to the second orientation. More particularly, the curved central longitudinal axis is curved about a center of curvature, and this center of curvature is moved beyond one of the sides of the transportation device when the wind turbine blade is moved to the second orientation. In the first orientation, this center of curvature is located in a vertical plane proximate to a longitudinal centerline of the transportation device. Accordingly, the transport device also includes a counterweight that moves towards the same side of the transportation device as the center of curvature to balance out tipping moments caused by the curved wind turbine blade in the second orientation. After the transportation device has turned, the wind turbine blade may be rotated back to the first orientation.

In another aspect, the transportation device includes a drive mechanism for rotating the wind turbine blade between the first and second orientations. In this regard, the method further includes determining with a controller that the transportation device is preparing to drive around a curve and actuating the drive mechanism with the controller to rotate the wind turbine blade before or during that curve. For example, the controller may include a user interface receiving commands from a driver of the truck to rotate the wind turbine blade when the driver indicates that the transportation device is approaching a curve or a turn.

In another example, the controller receives input signals from a turning sensor on a steering wheel of the transportation device, and the controller actuates rotation of the wind turbine blade when the turning sensor detects rotation of the steering wheel beyond a predetermined threshold. Alternatively, the controller receives input signals from a global positioning system when that system determines that the transportation device is approaching a curve or a turn. In this regard, the control of the rotation of the wind turbine blade may be manual or automatic.

In one embodiment of the invention, the transportation device includes a unitary tractor having each of the first and second support bearings. In this embodiment, rotating the wind turbine blade to the second orientation includes rotating the wind turbine blade along the central longitudinal axis. Additionally, the first support bearing is translated in a vertical direction relative to a fixed position of the second support bearing, and the first support bearing is also rotated about a horizontal axis transverse to the central longitudinal axis and rotated about a vertical axis.

In another embodiment, the transportation device includes a tractor with the first support bearing and a first trailer including the second support bearing. The first trailer is connected to the tractor by the wind turbine blade. In this embodiment, rotating the wind turbine blade to the second orientation includes rotating the wind turbine blade along the central longitudinal axis.

Additionally, at least one of the first and second support bearings are translated in a vertical direction, and the first and second support bearings are also rotated about corresponding horizontal axes transverse to the central longitudinal axis. The transportation device may further include a second trailer carrying a third support bearing located between the first and second support bearings. When the wind turbine blade is rotated to the second orientation, the third support bearing is optionally translated in a vertical direction opposite the translating movement of the first and second support bearings. The third support bearing and the second trailer also move along a horizontal axis transverse to the central longitudinal axis so that the third support bearing follows movements of the central portion of the wind turbine blade.

In another embodiment of the invention, a transportation device for transporting a curved wind turbine blade includes a tractor, a first support bearing coupled to the tractor, and a second support bearing. The first and second support bearings receive the wind turbine blade. The transportation device also includes a drive mechanism operable to rotate the wind turbine blade within the first and second support bearings between a first orientation and a second orientation. A curved central longitudinal axis of the wind turbine blade is located in a generally vertical plane in the first orientation and is located in a generally horizontal plane in the second orientation.

Advantageously, when the tractor is preparing to turn in a turning direction, the drive mechanism rotates the wind turbine blade to the second orientation before or during turning such that the curved central longitudinal axis bends in the turning direction.

In one aspect, the transportation device includes a bearing drive device coupled to one of the first and second support bearings. The bearing drive device translates the support bearing in a vertical direction during rotation of the wind turbine blade between the first and second orientations. In another aspect, each of the first and second support bearings includes a frame, a support located within the frame, and an annular bearing positioned between the frame and the support. The support includes an aperture sized to closely receive the wind turbine blade. The annular bearing enables free rotation of the support and the wind turbine blade along the central longitudinal axis. The drive mechanism may be independent from the first and second support bearings or may be operatively associated with at least one of the first and second support bearings.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 4A is a side view of a first embodiment of the transportation device of the current invention, showing the wind turbine blade in the first orientation;

FIG. 4B is a top view of the transportation device and wind turbine blade of FIG. 4A in the first orientation;

FIG. 5A is a side view of the transportation device of FIG. 4A, showing the wind turbine blade rotated to a second orientation;

FIG. 5B is a top view of the transportation device and wind turbine blade of FIG. 5A in the second orientation;

FIG. 6A is a rear view of the transportation device and wind turbine blade of FIG. 4A in the first orientation;

FIG. 6B is a rear view of the transportation device and wind turbine blade of FIG. 5A in the second orientation;

FIG. 7A is a side view of a second embodiment of the transportation device of the current invention, showing the wind turbine blade in the first orientation;

FIG. 7B is a top view of the transportation device and wind turbine blade of FIG. 7A in the first orientation;

DETAILED DESCRIPTION

Figure 1:
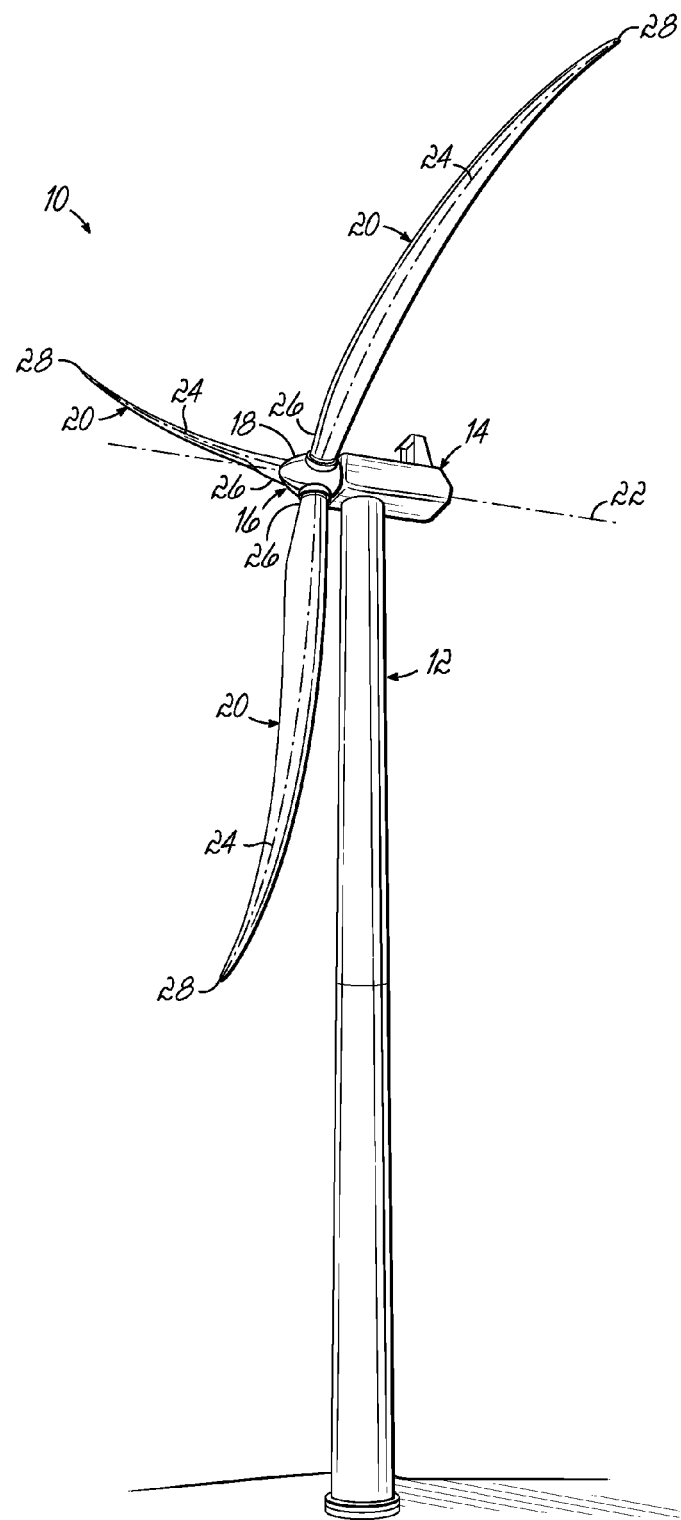
FIG. 1 is a diagrammatic view of a wind turbine having curved blades.

With reference to FIG. 1 and in accordance with an embodiment of the invention, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. To this end, the rotor 16 of wind turbine 10 includes a central hub 18 and at least one blade 20 that projects outwardly from the central hub 18. In the representative embodiment, the rotor 16 includes three blades 20 at locations circumferentially distributed thereabout, but the number may vary. The blades 20 are configured to interact with the passing air flow to produce lift that causes the central hub 18 to spin about a longitudinal axis 22.

The design and construction of the blades 20 are familiar to a person having ordinary skill in the art, although the blades 20 illustrated are curved wind turbine blades 20 used to improve the efficiency and reduce the stress loading of the blade 20 during operation. More particularly, each of the curved wind turbine blades 20 includes a curved central longitudinal axis 24 extending from a root end 26 adjacent the central hub 18 to a tip end 28 as schematically shown by phantom lines in FIG. 1. In this regard, each wind turbine blade 20 has a non-linear longitudinal profile that increases the effective flapwise width of the blade, as described in further detail below. It will be understood that the curved central longitudinal axis may be curved in different directions, such as forward or aft sweep, or coning, which will be of a substantially smaller extent, than the curvature shown in these figures without departing from the scope of the invention.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2A:
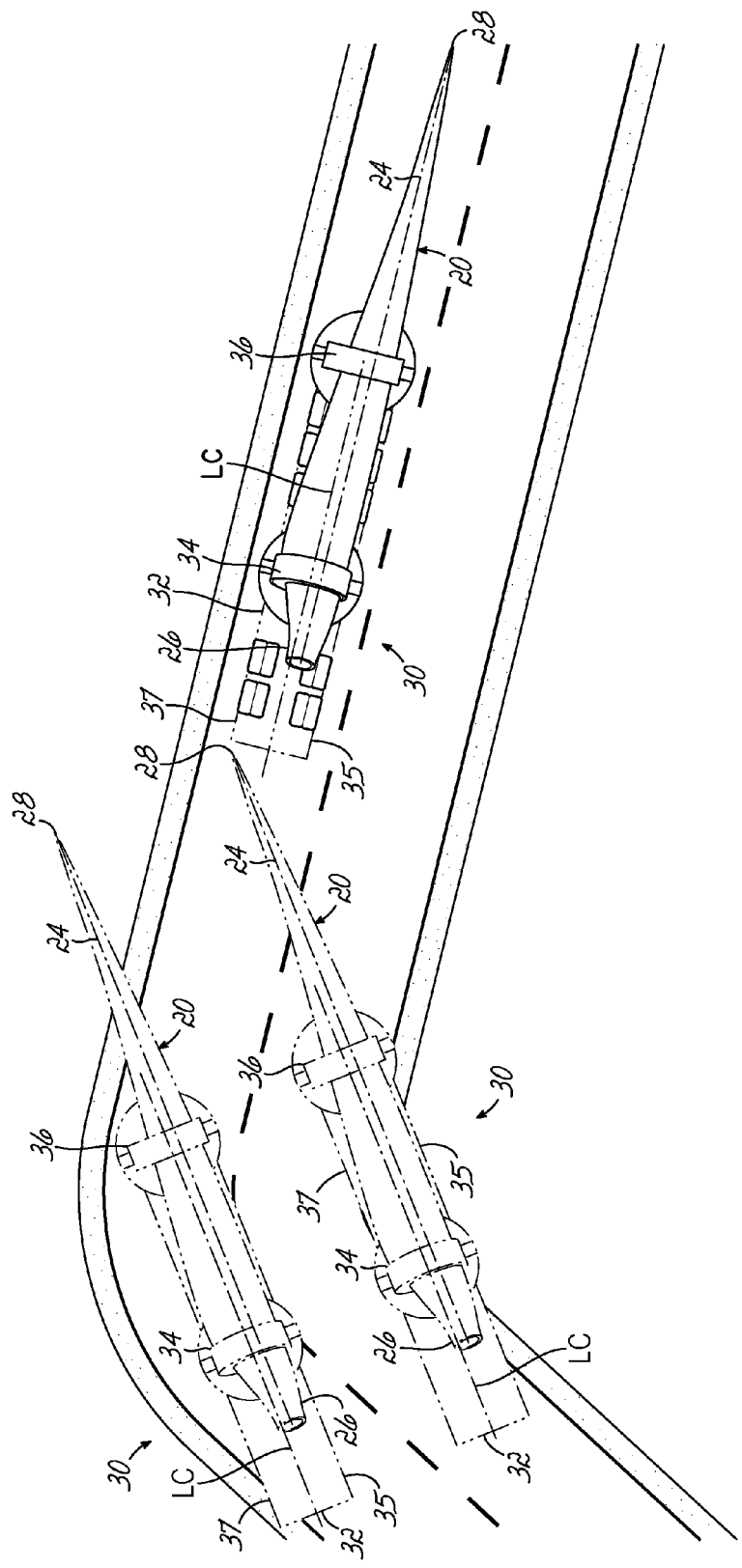
FIG. 2A is a top view of the transportation device of the current invention approaching and entering a turn with a wind turbine blade to illustrate potential hazards of navigating the turn.

As discussed above, the wind turbine 10 is typically assembled onsite at the wind farm or the wind park. Consequently, the components of the wind turbine 10 including the curved wind turbine blades 20 must be transported from a factory to the installation site via travel along the existing network of roads. As well understood, transportation devices such as tractor trailers are used to transport the wind turbine blades 20 along the roads. FIG. 2A illustrates one such transportation device 30 including a tractor 32 with first and second support bearings 34, 36 holding the curved wind turbine blade 20. As is common when traveling along the existing network of roads, the tractor 32 is approaching a curve or a turn that must be navigated while keeping the wind turbine blade 20 within the boundaries of the road. However, if the wind turbine blade 20 is kept in the orientation shown in FIG. 2A, it may be difficult, if not impossible, for the tractor 32 to navigate the turn without either swinging the tip end 28 of the blade 20 beyond the boundary of the road, which could cause damage to signs or other structures located just beyond the boundary, or cutting across the inner edge of the corner with the tractor 32 and the blade 20. Each of these possible problems is illustrated by the phantom-line representations of the transportation device 30 after entering the turn shown in FIG. 2A.

Figure 5C:
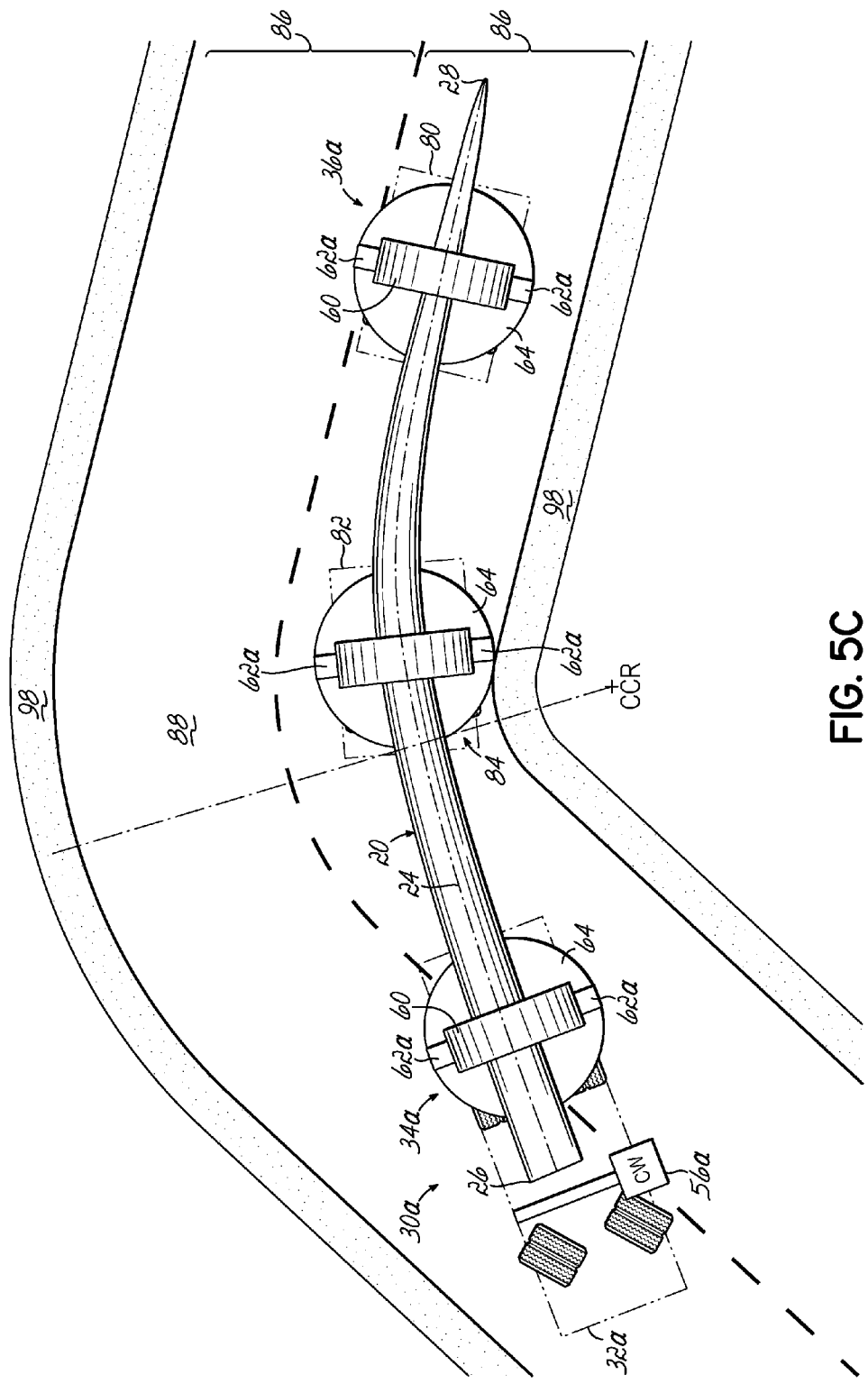
FIG. 5C is a top view of the transportation device and wind turbine blade of FIG. 5A during travel around a curve or turn.

As described in further detail below, the transportation device 30 of the current invention advantageously includes the support bearings and a drive mechanism that actuate rotation of the curved wind turbine blade 20 from a generally vertical first orientation when the transportation device 30 is about to turn around a curve in the road or at a road intersection, or alternatively, during turning, to a generally horizontal second orientation. Accordingly, the curved central longitudinal axis 24 of the blade 20 bends to follow the curvature of the turn or the road, thereby reducing or minimizing obstruction of other lanes or cutting across corners with the wind turbine blade 20 (examples are shown in FIGS. 5C and 8C and are described in further detail below). In this regard, the transportation device 30 of the current invention provides improved positioning of the wind turbine blade 20 relative to the boundaries of the road as shown in the phantom-line examples of FIG. 2A. To this end, the transportation device 30 and method of the current invention enables improved transportation of larger curved wind turbine blades 20 along the existing network of roads as compared to conventional transportation devices.

Figure 2B:
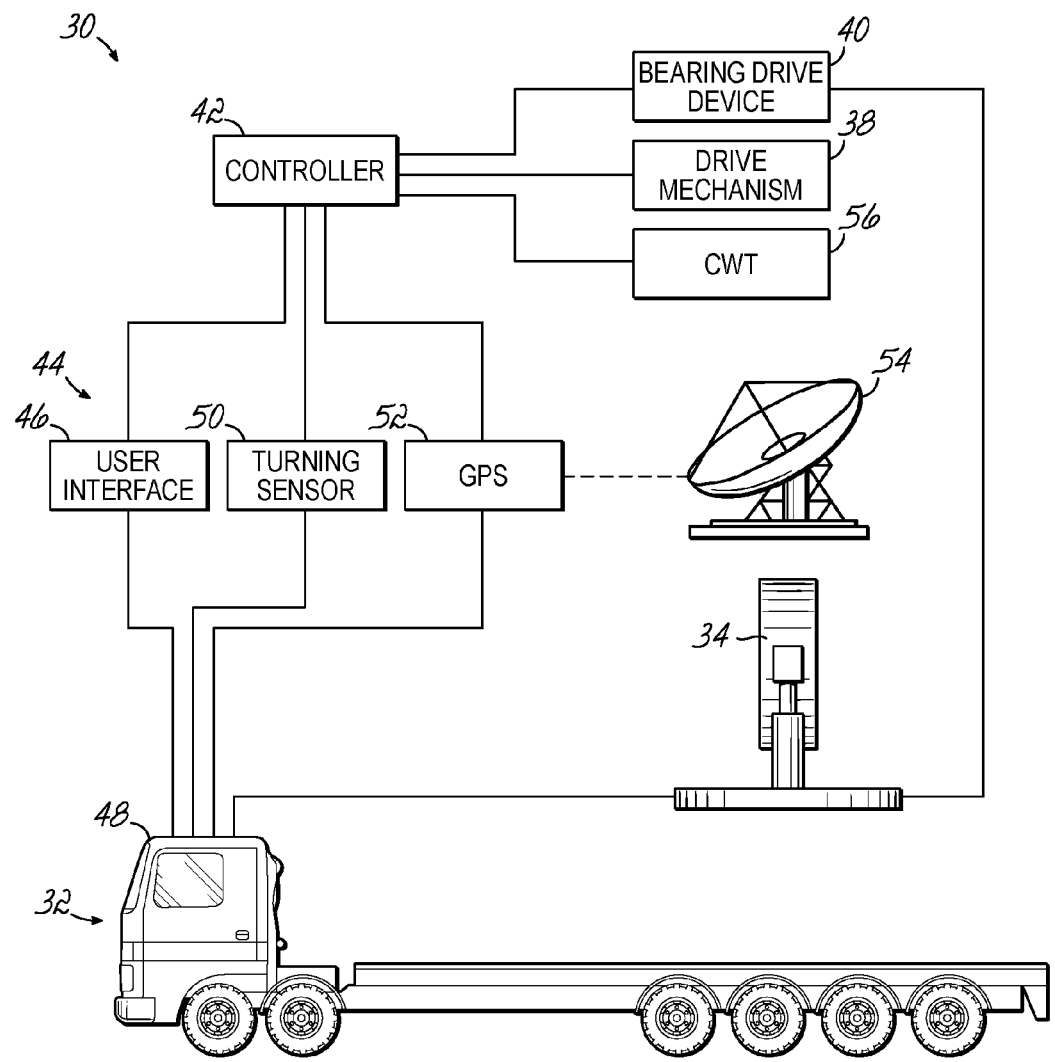
FIG. 2B is a schematic view of the transportation device of the current invention, illustrating various control and driven components.

With reference to FIGS. 2A and 2B, the transportation device 30 of the current invention is shown. The transportation device 30 includes the truck or tractor trailer hereinafter referred to as a tractor 32 and at least two support bearings 34, 36 (only the first support bearing 34 shown in FIG. 2B) for holding the curved wind turbine blade 20. The transportation device 30 and the tractor 32 include a longitudinal centerline LC that runs longitudinally to divide the transportation device 30 into equal halves extending transversely away from the longitudinal centerline LC. More particularly, the tractor 32 includes first and second longitudinal sides 35, 37 on opposite transverse sides of the longitudinal centerline LC. The transportation device 30 also includes a drive mechanism 38 for rotating the wind turbine blade 20 and at least one bearing drive device 40 for moving the corresponding support bearing 34 to accommodate the rotation of the wind turbine blade 20. The drive mechanism 38 and the bearing drive device 40 are operatively coupled to a controller 42 that actuates rotational movement of the wind turbine blade 20 when required by the transportation device 30 encountering a turn or a curve in the road. The controller 42 may be configured to automatically actuate the rotation or respond to a manual input signal to rotate the wind turbine blade 20 as described in further detail below. As explained in further detail below, it will be understood that the drive mechanism 38 may directly engage the wind turbine blade 20 to actuate rotation of the wind turbine blade 20 or may use the bearing drive device 40 and/or other drive devices associated with the support bearing 34, 36 to rotate the wind turbine blade 20 in various embodiments within the scope of the invention. To this end, the drive mechanism 38 may be independent from the support bearings 34, 36 or may be directly associated with the support bearings 34, 36 such as by integration with the bearing drive device 40.

In this regard, the transportation device 30 also includes a sensing device 44 configured to determine when the tractor 32 is turning or about to turn around a curve or at an intersection. Several examples of the sensing device 44 are shown schematically in FIG. 2B. In one aspect, the sensing device 44 includes a user interface 46 located within the cab 48 of the tractor 32. The user interface 46 receives manual or voice commands from a driver of the tractor 32 when the driver indicates that the tractor 32 is approaching a turn or a curve. When such a command is received, the user interface 46 sends a signal to the controller 42 to actuate rotation of the wind turbine blade 20 so that the curved central longitudinal axis 24 bends around the turn rather than cutting across the turn (as explained below). Accordingly, the user interface 46 enables manual control of the rotation of the wind turbine blade 20.

Alternatively, the sensing device 44 includes a turning sensor 50 in another aspect. The turning sensor 50 is coupled to the steering wheel (not shown) in the cab 48 of the tractor 32 and determines whether the steering wheel has been rotated beyond a predetermined threshold. When the turning sensor 50 detects a turn sharp enough to overcome the predetermined threshold, the turning sensor 50 sends a signal to the controller 42 to automatically rotate the wind turbine blade 20 to follow the curvature of the turn being performed. The predetermined threshold may be programmed to be any value based on the length and curvature of the wind turbine blade 20 being transported. In another aspect, the sensing device 44 includes a global positioning system (GPS) 52 that detects when the tractor 32 is approaching a curve in the road or a turn at an intersection. As well understood, the GPS 52 communicates with a satellite interface 54 to detect the current location and movements of the tractor 32 to determine when such a curve or turn is going to occur. Similar to the turning sensor 50, the GPS 52 sends a signal to the controller 42 to automatically cause rotation of the wind turbine blade 20 immediately before or during the turn. It will be appreciated that these and other types of sensing devices 44 may be used, alone or in combination with the sensing devices 44 described above, to signal the controller 42 to actuate rotation of the wind turbine blade 20 either manually or automatically in other embodiments without departing from the scope of the invention.

When rotating a curved wind turbine blade 20, a substantial portion of the mass of the wind turbine blade 20 may move off-center from the longitudinal center line LC of the transportation device 30. In order to counter any force-moments that may tend to cause the transportation device 30 to tip over, in one embodiment a counterweight 56 may also be provided on the tractor 32. The counterweight 56 is operably connected to the controller 42 as shown in FIG. 2B such that whenever the controller 42 actuates rotation of the wind turbine blade 20, a corresponding movement of the counterweight 56 is also actuated. More particularly, the counterweight 56 shifts towards one side 35 of the transportation device 30 while the central portion of the wind turbine blade 20 shifts towards an opposite side 37 as described in further detail with reference to FIG. 4B below. The counterweight 56 therefore applies an opposing force-moment on the transportation device 30 that reduces the possibility of a tip over during a turning operation.

Figure 3:
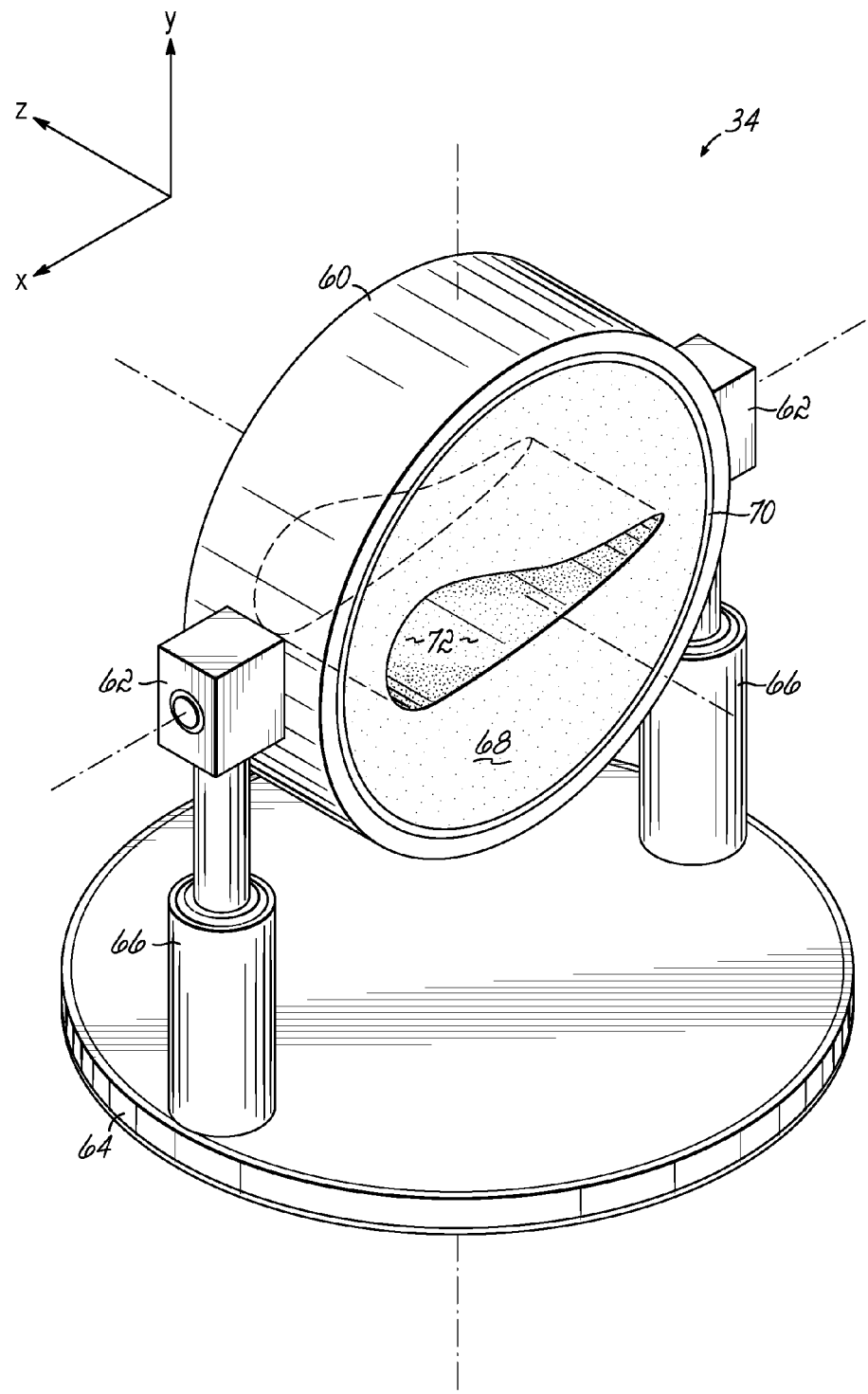
FIG. 3 is a perspective view of the support bearing used with the transportation device of FIGS. 2A and 2B.

With reference to FIG. 3, an exemplary embodiment of the support bearing 34 (or 36) used with the transportation device 30 is shown. For the purposes of description, directions are defined in FIG. 3 as the Z-axis corresponding to the horizontal axis along the longitudinal extent of the tractor 32 and generally the wind turbine blade 20, the Y-axis corresponding to the vertical axis, and the X-axis corresponding to the horizontal axis transverse to the longitudinal direction. The support bearing 34 includes a frame 60 pivotally coupled to a pair of support arms 62 that extend generally vertically (along the Y-axis shown in FIG. 3) from a platform base 64. The pivotal coupling of the frame 60 enables the frame 60 to freely rotate about the X-axis as shown in FIG. 3. The platform base 64 is rotatably mounted on the tractor 32 or a trailer as described in operation in further detail below. More specifically, the platform base 64 may be mounted on a rotational bearing (not shown) to the tractor 32 or a trailer so that the entire support bearing 34 is rotatable about the vertical Y-axis. Each of the support arms 62 includes a bearing drive device (schematically shown as 40 in FIG. 2B) such as the hydraulic linear actuators 66 shown in FIG. 3. These hydraulic linear actuators 66 operate to translate or move the frame 60 upwardly or downwardly along the Y-axis. Thus, the frame 60 is rotatable around the vertical Y-axis and is moveable along the vertical Y-axis.

Additionally, the support bearing 34 also enables freedom to rotate along the longitudinal or Z-axis. To this end, the support bearing 34 includes a support 68 (e.g., a foam support) positioned within the frame 60 and an annular bearing 70 located between the frame 60 and the support 68. In one example, the support 68 is an injection molded support structure having a generally cylindrical shape and including an aperture 72 extending through the support 68. The aperture 72 is sized to closely receive a particular portion of the wind turbine blade 20 to thereby cushion and support the wind turbine blade 20, as shown in further detail with reference to the particular embodiments shown in FIGS. 4A-8C. The support 68 will therefore typically be designed for a particular type of curved wind turbine blade 20 and could be replaced with a different support 68 when a differently sized or shaped blade 20 is to be transported. The annular bearing 70 is any conventional type of bearing (e.g., roller bearing) enabling free rotation of the support 68 with respect to the frame 60 about the longitudinal Z-axis. In sum, the particular portion of the wind turbine blade 20 that is held within the aperture 72 of the support 68 is capable of rotation about all axes (X, Y, and Z) and is also moveable by translation along at least one of the axes. It will be understood that the support bearing 34 and/or the drive mechanism 38 may include locking mechanisms (not shown) for preventing undesirable rotations or movements of the wind turbine blade 20 during transport. Consequently, the support bearing 34 reliably supports the wind turbine blade 20 in multiple orientations as the wind turbine blade 20 rotates generally along its longitudinal axis 24.

The operation of the transportation device 30 according to a first embodiment is shown in FIGS. 4A-6B. In this embodiment, the transportation device 30a and all previously described components are shown with the same reference numbers where appropriate, with the addition of an "a" on the end of the reference number to indicate this particular embodiment. The transportation device 30a of this embodiment includes a tractor 32a and first and second trailers 80, 82 coupled to the tractor 32a by the wind turbine blade 20. It will be understood that additional connections such as cable connections (not shown) may be provided between the tractor 32a and the trailers 80, 82 in some embodiments consistent with the invention. The tractor 32a includes a first support bearing 34a as previously described, which receives the wind turbine blade 20 therethrough proximate the root end 26 of the wind turbine blade 20. The first trailer 80 includes a second support bearing 36a as previously described, which receives the wind turbine blade 20 therethrough proximate the tip end 28 of the wind turbine blade 20. The second trailer 82 is located between the tractor 32a and the first trailer 80 and includes a third support bearing 84 similar to the first and second support bearings 34a, 36a. The third support bearing 84 receives the wind turbine blade 20 therethrough adjacent a central portion of the wind turbine blade 20. In this regard, the wind turbine blade 20 is fully supported at three locations along its longitudinal length. It will be understood that the second trailer 82 and the third support bearing 84 may be omitted in further non-illustrated embodiments of the invention depending on, for example, the length of the wind turbine blade 20 and possibly other factors. In this regard, the second trailer 82 and the third support bearing 84 are optional features that may be removed in other embodiments consistent with the scope of the invention. Additionally, the first trailer 80 and the second support bearing 36a could alternatively be positioned to receive the central portion of the wind turbine blade 20 rather than proximate the tip end 28 in other embodiments consistent with the current invention.

Figure 4C:
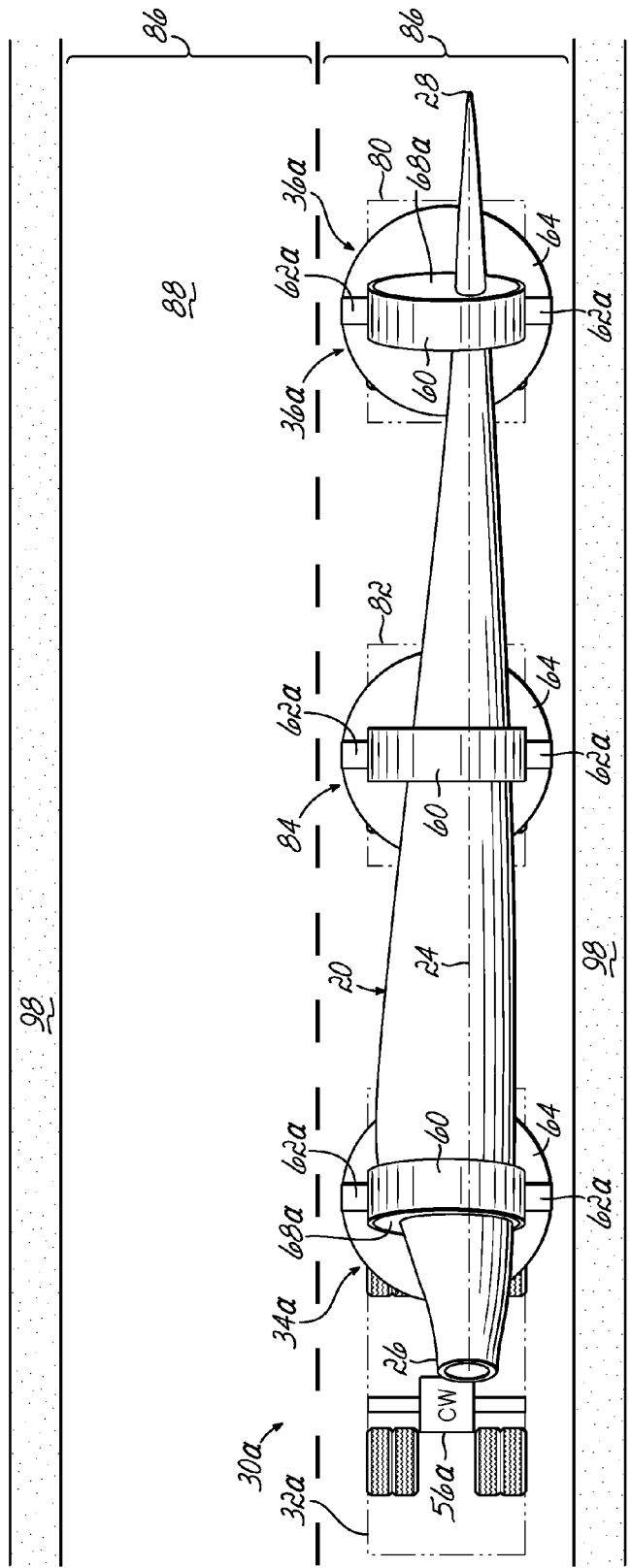
FIG. 4C is a top view of the transportation device and wind turbine blade of FIG. 4A during travel along a straight road.

Returning to FIGS. 4A-4C, the wind turbine blade 20 is loaded onto the transportation device 30a in a first orientation in which the curved central longitudinal axis 24 of the blade 20 is located in a generally vertical plane substantially located (or only slightly offset from) adjacent a longitudinal centerline LC of the tractor 32a. As shown in the side view of FIG. 4A, the curvature of the central longitudinal axis 24 also generally defines a center of curvature CC located within that vertical plane roughly centered on the tractor 32a. The curvature of the central longitudinal axis 24 in this embodiment is along the flapwise direction (i.e., between the pressure side and the suction side of the blade 20) so that the wind turbine blade 20 defines an effective flapwise width FW shown in FIG. 4A. This effective flapwise width FW is larger than the maximum edgewise width EW shown in FIG. 4B and measured between the leading and trailing edges of the wind turbine blade 20. Accordingly, the wind turbine blade 20 is loaded and normally kept in this first orientation so that the transportation device 30a and the wind turbine blade 20 in combination fit within the boundaries of a lane 86 on a road 88 as shown in FIG. 4C.

As shown in the first orientation of FIGS. 4A and 4B, the first and second support bearings 34a, 36a are pivoted in the X-axis slightly towards each other so that the corresponding supports 68a follow the profile of the wind turbine blade 20 near the root end 26 and the tip end 28. Also in this first orientation, the bearing drive devices 66a of each of the first and second support bearings 34a, 36a extend the corresponding support arms 62a higher than the support arms 62a of the third support bearing 84 at the center portion of the wind turbine blade 20. The counterweight 56a is also centrally located on the tractor 32a because the mass of the wind turbine blade 20 is not located substantially off-center from the longitudinal centerline LC. Accordingly, each of the support bearings 34a, 36a, 84 reliably supports the corresponding section of the wind turbine blade 20 during normal transport with the transportation device 30a.

When the transportation device 30a approaches a turn or curve in the road 88 (as sensed/determined by one or more of the various sensing devices 44 described above), the controller 42 actuates rotation of the wind turbine blade 20 generally about the central longitudinal axis 24 to a second orientation with the drive mechanism 38a, or alternatively, with the bearing drive device 66a, as shown in FIGS. 5A-5C. In one example, the drive mechanism 38a may directly couple to the wind turbine blade 20 such as at the root end 26 for directly rotating the blade 20 as previously performed in the art (e.g., the rotation mechanism described in U.S. Pat. No. 7,303,365 to Wobben). Alternatively or in addition, the drive mechanism 38a includes a mechanically or hydraulically powered device that rotates the supports 68a of one or more of the corresponding support bearings 34a, 36a, 84 to cause rotation of the wind turbine blade 20. It will be understood that other types of drive mechanisms 38a known in the art for turning wind turbine blades 20 may also be used within the scope of this invention.

In addition to the rotation of the wind turbine blade 20 along the central longitudinal axis 24, the controller 42 may also actuate additional movements of the support bearings 34a, 36a and the counterweight 56a. More particularly, the bearing drive devices 66a of the first and second support bearings 34a, 36a translate the corresponding support arms 62a downwardly along the Y-axis while the bearing drive device 66a of the third support bearing 84 translates the corresponding support arms 62a upwardly in the Y-axis. These translational movements are shown by arrows 90 in FIG. 5A. Alternatively, the first and second support bearings 34a, 36a may translate downwardly along the Y-axis while the third support bearing 84 remains stationary. Additionally, the first and second support bearings 34a, 36a freely rotate about both the transverse X-axis (as shown by arrows 92 in FIG. 5A) and the vertical Y-axis (as shown by arrows 94 in FIG. 5B) away from one another to accommodate the rotation of the wind turbine blade 20. The third support bearing 84 and the second trailer 82 also translate along the transverse X-axis to follow the movement of the central portion of the wind turbine blade 20 as indicated by arrow 96 in FIG. 5B. The collective effect of each of these rotational and translational movements is that the wind turbine blade 20 rotates to the second orientation in which the curved central longitudinal axis 24 is disposed in a generally horizontal plane as shown. To this end, the curved central longitudinal axis 24 is moved to bend around the turn to be performed. It will be understood that in alternative embodiments such as the one described above with an omitted second trailer 82 and a first trailer 80 at the center portion of the wind turbine blade 20, only one of the first and second support bearings 34a, 36a would be required to translate along the Y-axis during rotation of the wind turbine blade 20.

At the same time as these rotational and translational movements of the three support bearings 34a, 36a, 84, the controller 42 may move the counterweight 56a with respect to the longitudinal centerline LC to the opposite side (35a) of the tractor 32a as the central portion of the wind turbine blade 20 to equalize force-moments applied to the tractor 32a. In other words, the counterweight 56a moves to the same side 35a of the tractor 32a as the center of curvature CC of the central longitudinal axis 24 of the blade 20. The likelihood of the transportation device 30a tipping over while traversing the turn is reduced by this movement of the counterweight 56a.

The benefits of rotating the wind turbine blade 20 to the second orientation are most clearly shown in FIG. 5C, which illustrates the transportation device 30a of this embodiment during the turn around the curve in the road 88. In contrast to the turn illustrated on the inner side of the road in FIG. 2A, the movements of the wind turbine blade 20 and the transportation device 30a to the second orientation enable the wind turbine blade 20 to bend around the curve rather than cut across a boundary 98 of the road 88. More specifically, the curve generally defines a center of curvature CCR that is located on the same side of the road 88 as the center of curvature CC of the wind turbine blade 20. The curvature of the wind turbine blade 20 also limits the amount of intrusion into the other lane 86 on the road 88 during the turning movement. As a result, the transportation device 30a and wind turbine blade 20 can advantageously traverse much sharper curves and turns than conventional transportation devices. Following the turn, the transportation device 30a rotates the wind turbine blade 20 back to the first orientation to contain the transportation device 30a within one lane 86 as previously described. This improvement allows the wind turbine blade 20 to be transported along more direct routes than what may be required otherwise, thereby enabling faster and more efficient transport of the wind turbine blade 20 to the assembly site or quayside. It will be appreciated that the wind turbine blade 20 can rotate to the second orientation in either direction such that turns or curves in both directions may be traversed more easily. Furthermore, it will be understood that the wind turbine blade 20 may be rotated to the second orientation before traversing a turn when the road 88 provides enough overall width for the second trailer 82 to translate outwardly as shown in FIG. 5C, or may be rotated to the second orientation only during the turning motion when the road is narrower to avoid pushing the second trailer 82 off the side of the road 88.

Additionally, the rotation of the wind turbine blade 20 from the first orientation to the second orientation also has additional benefits during transport. For example, the curved nature of the wind turbine blade 20 and the high flapwise width FW may make the combined tractor 32a and blade 20 too tall to pass under certain bridges on the road 88. However, turning the wind turbine blade 20 to the second orientation reduces the overall height as a result of the edgewise width EW being smaller than the flapwise width FW, which enables the transportation device 30a to pass under those bridges. This benefit is shown by the phantom line bridge overpass 100 shown in the rear views of FIGS. 6A and 6B. Thus, the transportation device 30a of the current invention enables transport of large curved wind turbine blades 20 along a higher percentage of the existing network of roads and provides multiple benefits.

With reference to FIGS. 7A-8C, a second embodiment of a transportation device 30b according to the invention is shown. As with the previously described embodiment, the transportation device 30b and all previously described components are shown with the same reference numbers where appropriate, with the addition of an "b" on the end of the reference number to indicate this particular embodiment. The transportation device 30b of this embodiment includes a unitary tractor 32b without any trailers. Thus, the tractor 32b includes a first support bearing 34b and a second support bearing 36b as previously described, which receive the wind turbine blade 20 therethrough. More specifically, the first support bearing 34b is located near the cab 48 and receives the wind turbine blade 20 proximate the root end 26, while the second support bearing 36b is located at a rear end of the tractor 32b and receives the wind turbine blade 20 proximate a central portion. In this regard, the wind turbine blade 20 is fully supported at two locations along its longitudinal length. It will be understood that more than two support bearings may be provided on the tractor 32b in other embodiments consistent with the scope of the invention, depending on, for example, the length of the wind turbine blade 20 and possibly other factors.

Figure 7C:
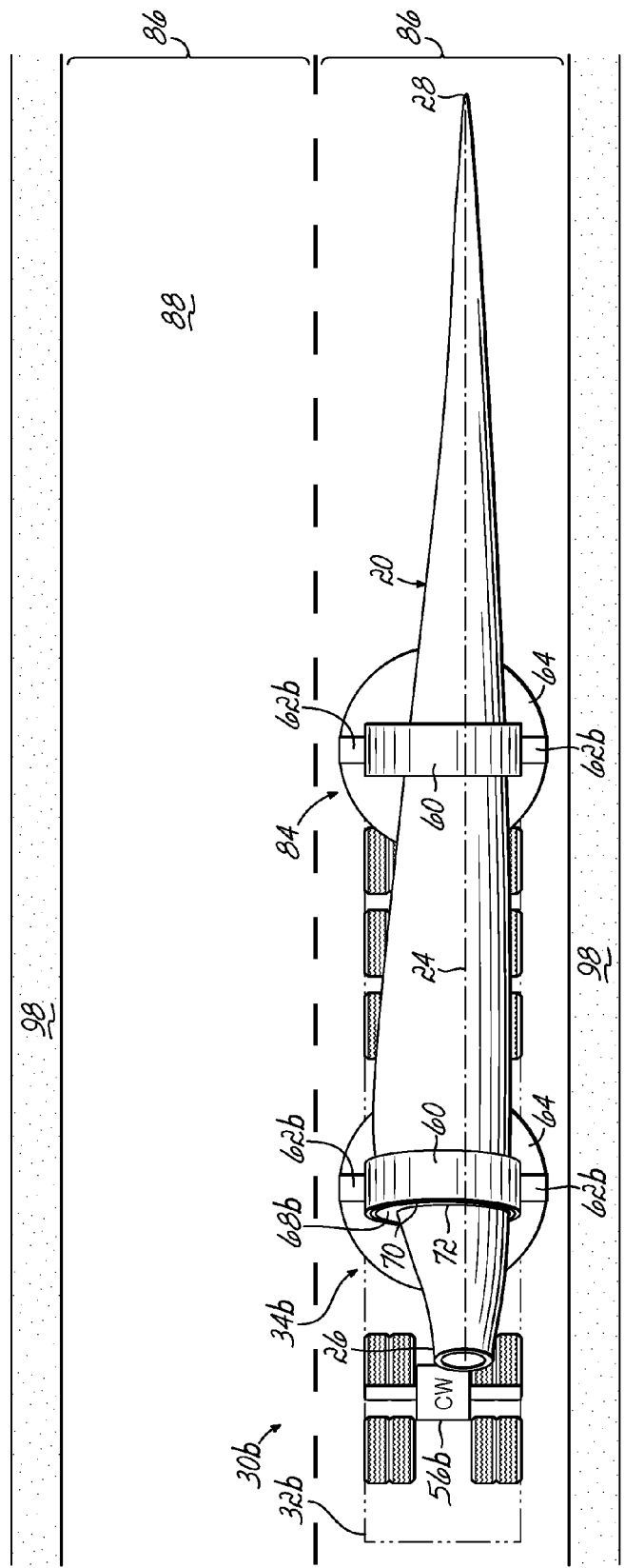
FIG. 7C is a top view of the transportation device and wind turbine blade of FIG. 7A during travel along a straight road.

Returning to FIGS. 7A-7C, the wind turbine blade 20 is loaded onto the transportation device 30b in a first orientation in which the curved central longitudinal axis 24 of the blade 20 is located in a generally vertical plane substantially located (or only slightly offset from) along a longitudinal centerline LC of the tractor 32b. As shown in the side view of FIG. 7A, the curvature of the central longitudinal axis 24 also generally defines a center of curvature CC located within that vertical plane roughly centered on the tractor 32b. The curvature of the central longitudinal axis 24 in this embodiment is once again along the flapwise direction (i.e., between the pressure side and the suction side of the blade 20), which causes the wind turbine blade to define a larger flapwise width FW than an edgewise width EW. Accordingly, the wind turbine blade 20 is loaded and normally kept in this first orientation so that the transportation device 30b and the wind turbine blade 20 in combination fit within the boundaries of a lane 86 on a road 88 as shown in FIG. 7C.

As shown in the first orientation of FIGS. 7A and 7B, the first support bearing 34b is pivoted in the X-axis slightly towards the second support bearing 36b so that the corresponding supports 68b follow the profile of the wind turbine blade 20 near the root end 26 and the central portion. Also in this first orientation, the bearing drive device 66b of the first support bearing 34b extends the corresponding support arms 62b higher than the support arms 62b of the second support bearing 36b at the center of the wind turbine blade 20. The counterweight 56b is also centrally located on the tractor 32b because the mass of the wind turbine blade 20 is not located substantially off-center from the longitudinal centerline LC. Accordingly, each of the support bearings 34b, 36b reliably supports the corresponding section of the wind turbine blade 20 during normal transport with the transportation device 30b.

Figure 8A:
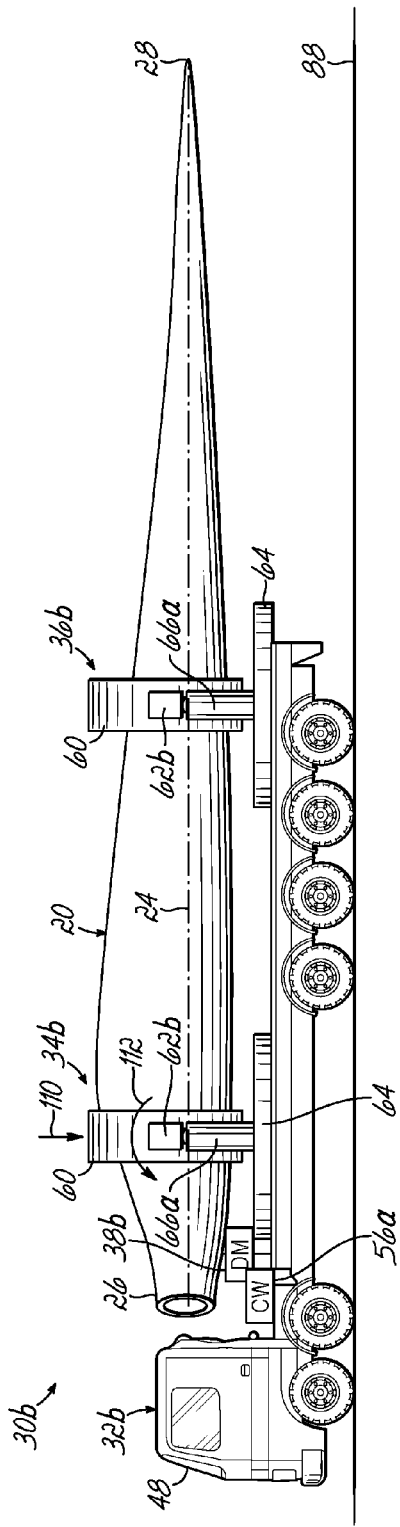
FIG. 8A is a side view of the transportation device of FIG. 7A, showing the wind turbine blade rotated to a second orientation.
Figure 8B:
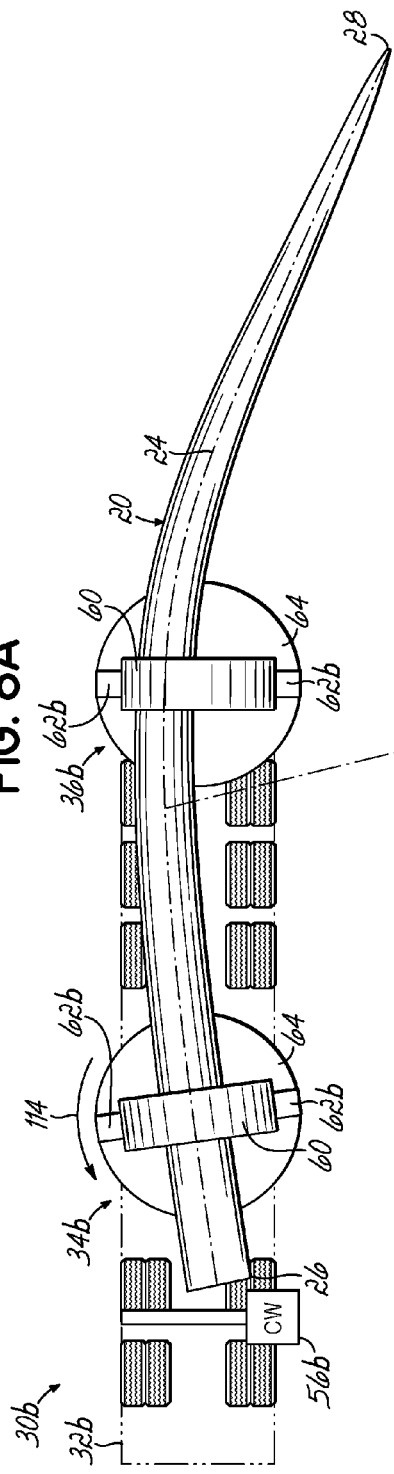
FIG. 8B is a top view of the transportation device and wind turbine blade of FIG. 8A in the second orientation.
Figure 8C:
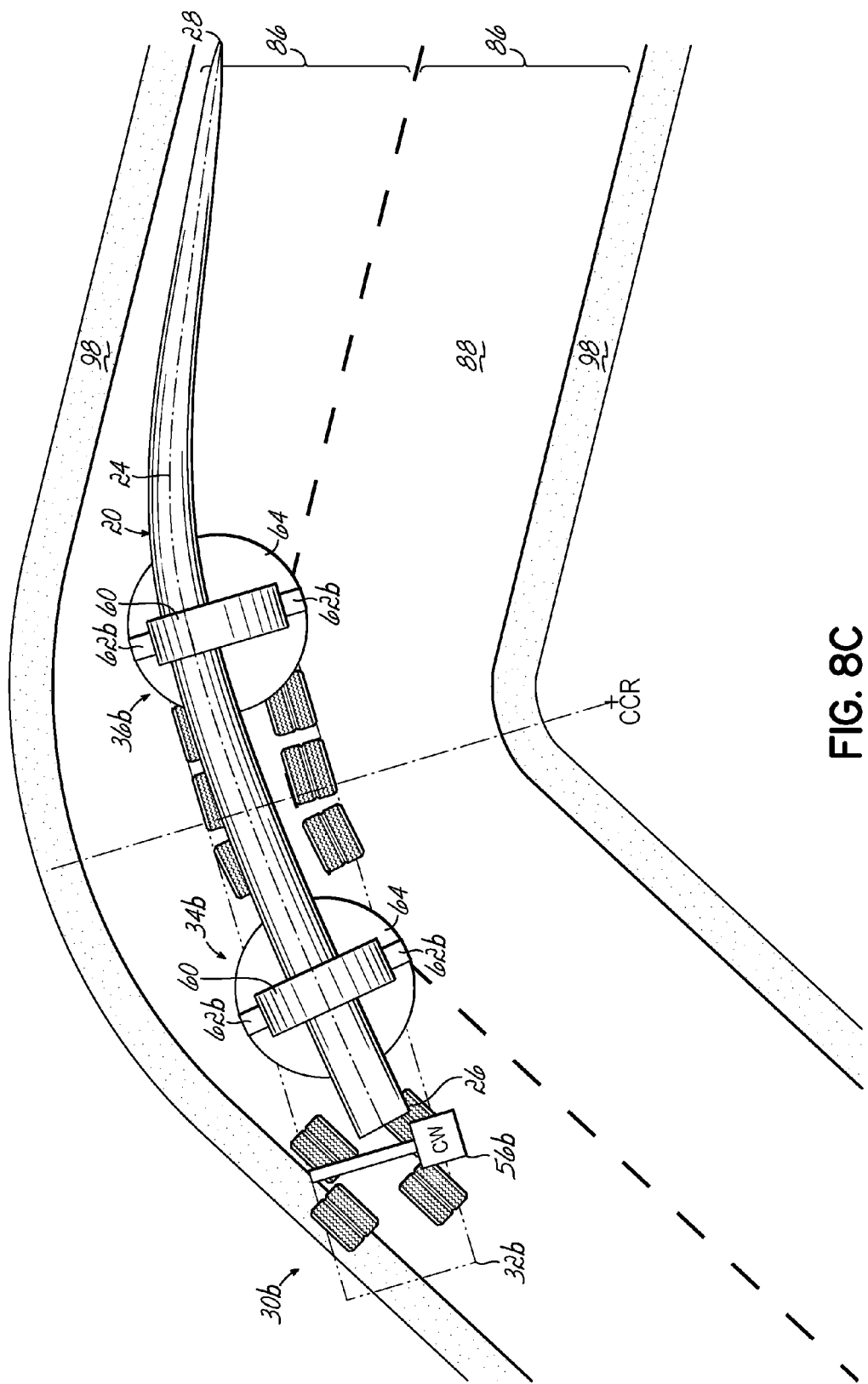
FIG. 8C is a top view of the transportation device and wind turbine blade of FIG. 8A during travel around a curve or turn.

When the transportation device 30b approaches a turn or curve in the road 88 (as sensed/determined by one or more of the various sensing devices 44 described above), the controller 42 actuates rotation of the wind turbine blade 20 generally about the central longitudinal axis 24 to a second orientation with the drive mechanism 38b, or alternatively, with the bearing drive device 66b, as shown in FIGS. 8A-8C. As previously described, the drive mechanism 38b may directly engage and rotate the wind turbine blade 20 such as at the root end 26, or the drive mechanism 38b may rotate the supports 68b of the corresponding support bearings 34b, 36b to rotate the wind turbine blade 20. In either case, the wind turbine blade 20 rotates generally about its central longitudinal axis 24.

In addition to the rotation of the wind turbine blade 20 along the central longitudinal axis 24, the controller 42 may also actuate additional movements of the first support bearing 34b and the counterweight 56b. More particularly, the bearing drive device 66b of the first support bearing 34b translates the corresponding support arms 62b downwardly along the Y-axis while the support arms 62b of the second support bearing 36b remain fixed in position. This translational movement is shown by arrow 110 in FIG. 8A. Additionally, the first support bearing 34b freely rotates about both the transverse X-axis (as shown by arrow 112 in FIG. 8A) and the vertical Y-axis (as shown by arrows 114 in FIG. 8B) to pivot away from the second support bearing 36b to accommodate the rotation of the wind turbine blade 20. Although the second support bearing 36b is shown with no rotational movements in these figures, it will be understood that the second support bearing 36b may rotate about these X and Y axes in some embodiments depending on the particular shape and profile of the wind turbine blade 20. The collective effect of each of these rotational and translational movements is that the wind turbine blade 20 rotates to the second orientation in which the curved central longitudinal axis 24 is disposed in a generally horizontal plane as shown. To this end, the curved central longitudinal axis 24 is moved to bend around the turn to be performed.

At the same time as these rotational and translational movements of the first support bearing 34b, the controller 42 may move the counterweight 56b with respect to the longitudinal centerline LC to the opposite side (35b) of the tractor 32b as the central portion of the wind turbine blade 20 to equalize force-moments applied to the tractor 32b. In other words, the counterweight 56b moves to the same side 35b of the tractor 32b as the center of curvature CC of the central longitudinal axis 24 of the blade 20. The likelihood of the transportation device 30b tipping over while traversing the turn is reduced by this movement of the counterweight 56b.

The benefits of rotating the wind turbine blade 20 to the second orientation are most clearly shown in FIG. 8C, which illustrates the transportation device 30b of this embodiment during the turn around the curve in the road 88. In contrast to the turn illustrated on the outer side of the road in FIG. 2A, the movements of the wind turbine blade 20 and the transportation device 30b to the second orientation enable the wind turbine blade 20 to bend around the curve rather than swing the tip end 28 of the blade 20 across a boundary 98 of the road 88. More specifically, the curve generally defines a center of curvature CCR that is located on the same side of the road 88 as the center of curvature CC of the wind turbine blade 20. The curvature of the wind turbine blade 20 also limits the amount of intrusion into the other lane 86 on the road 88 during the turning movement. As a result, the transportation device 30b and wind turbine blade 20 can advantageously traverse much sharper curves and turns than conventional transportation devices. Following the turn, the transportation device 30b rotates the wind turbine blade 20 back to the first orientation to contain the transportation device 30b within one lane 86 as previously described. This improvement allows the wind turbine blade 20 to be transported along more direct routes than what may be required otherwise, thereby enabling faster and more efficient transport of the wind turbine blade 20 to the assembly site or quayside.

It is clear to the skilled person that all the Figs. show a left hand turn, but that a right hand turn might as well be performed. In case a chord width is very large, i.e. large a width transverse to the line 24, FIGS. 8A, 7B, 5A and 4B, it may be an option to elevate the blade 20 by the support arms 62b and bearing drive devices 66b, before rotating the blade into the have an orientation suitable for and corresponding to the direction of the road turn.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of the general inventive concept.

What is claimed is:

1. A transportation device for transporting a wind turbine blade defining a curved central longitudinal axis, the transportation device comprising:

a tractor;
a first support bearing coupled to the tractor and configured to receive the wind turbine blade therethrough;
a second support bearing configured to receive the wind turbine blade therethrough;
a wind turbine blade having a curved central longitudinal axis and being supported by the first and second support bearings, and a drive mechanism operable to rotate the wind turbine blade within the first and second support bearings between a first orientation in which the curved central longitudinal axis is located in a generally vertical plane and a second orientation in which the curved central longitudinal axis is located in a generally horizontal plane, and
a controller arranged to actuate the drive mechanism and thereby actuate rotational movement of the wind turbine blade between the first and the second orientations as well as between the second and the first orientations,
wherein when the tractor is preparing to turn in a turning direction, the drive mechanism rotates the wind turbine blade to the second orientation before or during turning such that the curved central longitudinal axis bends in the turning direction.

2. The transportation device according to claim 1, further comprising:
a sensing device configured to determine when the tractor is preparing to drive around a curve; and
said controller operatively coupled to the sensing device and the drive mechanism, the controller operable to actuate the drive mechanism to rotate the wind turbine blade before the tractor drives around the curve.

3. The transportation device according to claim 2, wherein the sensing device includes a user interface for receiving commands from a driver of the tractor, and the controller receives a signal from the user interface when the driver determines that the wind turbine blade requires rotation.

4. The transportation device according to claim 2, wherein the sensing device includes a turning sensor located on a steering wheel of the tractor, and the controller automatically actuates the drive mechanism to rotate the wind turbine blade whenever the turning sensor sends a signal indicating that the steering wheel is turning beyond a predetermined threshold.

5. The transportation device according to claim 2, wherein the sensing device includes a global positioning system that detects when the tractor is approaching a curve and the controller automatically actuates the drive mechanism to rotate the wind turbine blade whenever the global positioning system has detected that the tractor is approaching a curve.

6. The transportation device according to claim 2, wherein the tractor includes first and second sides, the curved central longitudinal axis is curved about a center of curvature, and the transportation device further comprises:
a counterweight moveably mounted on the tractor, wherein the controller is configured to actuate movement of the counterweight towards a same side of the tractor as the center of curvature during rotation of the wind turbine blade towards the second orientation.

7. The transportation device according to claim 1, wherein the second support bearing is fixedly coupled to the tractor, and the transportation device further comprises:
a first bearing drive device operatively coupled to the first support bearing and configured to translate the first support bearing in a vertical direction relative to the second support bearing during rotation of the wind turbine blade between the first and second orientations.

8. The transportation device according to claim 7, wherein the first support bearing further includes a frame pivotally coupled to the tractor, the frame enabling free rotation of the first support bearing about a horizontal axis transverse to the central longitudinal axis and rotation about a vertical axis during rotation of the wind turbine blade between the first and second orientations.

9. The transportation device according to claim 8, wherein the first support bearing further comprises:
a support disposed within the frame and including an aperture sized to closely receive the wind turbine blade therethrough; and
an annular bearing positioned between the frame and the support and configured to enable free rotation of the support and the wind turbine blade along the central longitudinal axis.

10. The transportation device according to claim 1, further comprising:
a first trailer coupled to the tractor by the wind turbine blade, the second support bearing being coupled to the first trailer; and
a first bearing drive device operatively coupled to the first support bearing and configured to translate the first support bearing in a vertical direction during rotation of the wind turbine blade between the first and second orientations.

11. The transportation device according to claim 10, further comprising:
a second bearing drive device operatively coupled to the second support bearing and configured to translate the second support bearing in a vertical direction during rotation of the wind turbine blade between the first and second orientations.

12. The transportation device according to claim 11, wherein each of the first and second support bearings further includes a frame pivotally coupled to the tractor or the first trailer, the frames enabling free rotation of the first and second support bearings towards or away from each other about corresponding horizontal axes transverse to the central longitudinal axis during rotation of the wind turbine blade between the first and second orientations.

13. The transportation device according to claim 12, wherein each of the first and second support bearings further comprises:
a support disposed within the frame and including an aperture sized to closely receive the wind turbine blade therethrough; and
an annular bearing positioned between the frame and the support and configured to enable free rotation of the support and the wind turbine blade along the central longitudinal axis.

14. The transportation device according to claim 11, further comprising:
a second trailer located between the tractor and the first trailer; a third support bearing coupled to the second trailer and configured to receive the wind turbine blade therethrough; and
a third bearing drive device operatively coupled to the third support bearing and configured to optionally translate the third support bearing in a vertical direction opposite the translating movement of the first and second support bearings during rotation of the wind turbine blade between the first and second orientations.

15. The transportation device according to claim 1, wherein the drive mechanism is independent from the first and second support bearings.

16. The transportation device according to claim 1, wherein the drive mechanism is operatively associated with at least one of the first and second support bearings.

* * * * *